(12) United States Patent
Hockemeyer et al.

(10) Patent No.: US 9,850,597 B2
(45) Date of Patent: Dec. 26, 2017

(54) APPARATUS FOR FORMING A LENO SELVEDGE, IN PARTICULAR FOR A LOOM, AND PROJECTILE WEAVING MACHINE HAVING SAID APPARATUS

(71) Applicants: Kurt Hockemeyer, Borken-Weseke (DE); Christoph Schwemmlein, Borken-Weseke (DE)

(72) Inventors: Kurt Hockemeyer, Borken-Weseke (DE); Christoph Schwemmlein, Borken-Weseke (DE)

(73) Assignee: Gebruder Klocker GmbH, Borken-Weseke (DE)

( * ) Notice: Subject to any disclaimer, the term of this patent is extended or adjusted under 35 U.S.C. 154(b) by 0 days.

(21) Appl. No.: 15/334,956

(22) Filed: Oct. 26, 2016

(65) Prior Publication Data

US 2017/0121866 A1    May 4, 2017

(30) Foreign Application Priority Data

Oct. 28, 2015  (EP) .................................... 15191962

(51) Int. Cl.
*D03C 7/04* (2006.01)
*D03C 7/00* (2006.01)

(52) U.S. Cl.
CPC ...................... *D03C 7/00* (2013.01)

(58) Field of Classification Search
CPC ... D03C 7/06; D03C 7/00; D03C 7/08; D03C 7/04; D03D 19/00; D03D 5/00
See application file for complete search history.

(56) References Cited

U.S. PATENT DOCUMENTS

| | | | | |
|---|---|---|---|---|
| 5,996,646 A * | 12/1999 | Hockemeyer | ............ | D03C 7/04 139/54 |
| 6,006,793 A * | 12/1999 | Krumm | .................... | D03C 7/04 139/54 |
| 6,098,669 A * | 8/2000 | Klocker | .................... | D03C 7/04 139/54 |
| 6,102,080 A * | 8/2000 | Hockemeyer | ............ | D03C 7/02 139/52 |
| 6,116,291 A * | 9/2000 | Hockemeyer | ............ | D03C 7/02 139/51 |
| 6,179,012 B1 * | 1/2001 | Nowack | .................... | D03C 7/00 139/54 |
| 6,244,304 B1 * | 6/2001 | Hockemeyer | ............ | D03C 7/00 139/54 |

(Continued)

*Primary Examiner* — Bobby Muromoto, Jr.
(74) *Attorney, Agent, or Firm* — Dinsmore & Shohl LLP

(57) ABSTRACT

An apparatus for forming a leno selvage, in particular for a loom, includes a fixed-position housing, a support having the shape of a circular ring or of a circular disk and rotatably supported in the housing by a bearing and having two diagonally oppositely disposed thread eyelets for guiding leno threads in the region of the inner race of the bearing. At least two ring gears of magnetizable material extending in parallel with one another are arranged on the outer periphery of the support. A plurality of magnets are arranged on the outer periphery of the support in the region of the ring gears. A stator sheet package of circular ring shape having a plurality of coils arranged thereat has segments each having a toothed arrangement associated with the toothed arrangement of the ring gears in the region of the coils.

13 Claims, 4 Drawing Sheets

(56) References Cited

U.S. PATENT DOCUMENTS

| | | | | |
|---|---|---|---|---|
| 6,246,147 B1* | 6/2001 | Hockemeyer | D03C 7/04 | 310/267 |
| 6,286,560 B1* | 9/2001 | Schwemmlein | D03C 7/04 | 139/54 |
| 6,814,107 B2* | 11/2004 | Schwemmlein | D03C 7/00 | 139/351 |
| 6,955,191 B2* | 10/2005 | Hockemeyer | D03C 7/02 | 139/51 |
| 7,040,354 B2* | 5/2006 | Schwemmlein | B65H 59/04 | 139/102 |
| 7,185,679 B2* | 3/2007 | Schwemmlein | D03C 7/02 | 139/54 |
| 8,590,578 B2* | 11/2013 | Schwemmlein | D03C 7/00 | 139/11 |
| 8,893,750 B2* | 11/2014 | Hockemeyer | D03C 7/06 | 139/11 |
| 2003/0024588 A1* | 2/2003 | Schwemmlein | D03C 7/00 | 139/11 |
| 2004/0108012 A1* | 6/2004 | Hockemeyer | D03C 7/02 | 139/11 |
| 2004/0154680 A1* | 8/2004 | Schwemmlein | B65H 59/04 | 139/103 |
| 2005/0284532 A1* | 12/2005 | Schwemmlein | D03C 7/02 | 139/55.1 |
| 2013/0160890 A1* | 6/2013 | Schwemmlein | D03C 7/00 | 139/50 |
| 2013/0333794 A1* | 12/2013 | Hockemeyer | D03C 7/06 | 139/419 |
| 2017/0121866 A1* | 5/2017 | Hockemeyer | D03C 7/00 | |

* cited by examiner

APPARATUS FOR FORMING A LENO SELVEDGE, IN PARTICULAR FOR A LOOM, AND PROJECTILE WEAVING MACHINE HAVING SAID APPARATUS

CROSS-REFERENCE TO RELATED APPLICATION

This application claims priority from European patent application Serial No. EP 15 191 962.8, filed Oct. 28, 2015, the contents of which are incorporated herein in their entirety.

FIELD OF THE INVENTION

The invention relates, on the one hand, to an apparatus for forming a leno selvage, in particular for a loom, and, on the other hand, to a projectile loom having said apparatus.

BACKGROUND OF THE INVENTION

Apparatus for forming a leno selvage, in particular for shuttleless looms, comprising an electric motor having a rotor are known from the prior art, wherein the rotor has at least two guide elements spaced apart from one another for the leno thread for forming the leno selvage with the corresponding weft threads. An apparatus is known from the patent specification DE 4405776, for instance, in which an electrically controllable actuating motor is provided which drives a selvage disk, wherein the selvage disk forms the rotor of the electrically controllable actuating motor. The stator itself is attachable to the loom by a support part, and indeed preferably in a free space before the first heddle shafts of the loom which are disposed between the longitudinal beams and the strands. Provision is made in detail in this respect that the leno disk which forms the rotor of the electrically controllable actuating motor has two openings for the leno threads, the openings being arranged opposite one another, as guide elements. This known rotary leno selvage of a loom now works such that it carries out a few dozen revolutions in one direction and in so doing binds off a weft thread after a respective one revolution. A full leno selvage is thus produced. On the side of the feed of the two leno threads, said leno threads are twisted in accordance with the number of revolutions of the selvage disk such that a reversal of the direction of rotation is indicated to cancel this twist, that is the leno disk consequently has to rotate in exactly the opposite direction. The number of revolutions in each direction must in this respect be the same on average over time. If no reversal of the direction of rotation were made, the leno threads would tear at some time due to the increasing tension as a result of the increasing twisting.

A similar rotary leno selvage having an electromagnetic drive is known from DE 197 33 261 C2, wherein this motor works in the manner of a servo motor. A measurement of the rotational angle for the purpose of detecting a defined angular position of the leno disk is provided to this extent to coordinate the rotation of the leno disk with the shed opening of the loom. This means that the leno disk carries out a continuous movement coordinated with the speed with respect to the stroke movement of the heddle shafts toward the shed opening or toward the shed closing of the loom.

A so-called propeller leno is now known from EP 839 219 B1. Such a propeller leno is characterized by two arms arranged diagonally opposite at the rotor of an electric motor and thus by a small moved mass so that, as is described in EP 1 019 571 B1, such a propeller leno is controllable independently of the movement of the heddle shafts. This means that the acceleration of the propeller leno is such that, at the time of the opening of the leno shed by the shafts of the loom, the arms of the propeller leno having the eyelets which are arranged at the end side and through which the leno threads run have already raised the shed. The propeller leno is thus controlled independently of the shaft. This means that it is ensured by the known propeller leno that at the start of the weft insertion by the leno selvage apparatus, the two leno threads are also in the shed opening and the leno threads are moved directly into the closed shed position after the end of the weft insertion. It is thus only important that the respective end position, that is shed open or shed closed, is achieved by the apparatus at the latest when the heddle shafts have adopted a corresponding position. This means that a movement procedure synchronous for every point in time between the movement of the rotor of the electric motor with the movement of the heddle shafts is not required.

It is additionally known to provide a so-called cutting lane in looms having long warp beams in the fabric. The fabric is divided in this respect, wherein two leno selvage apparatus are provided in the region of the cutting lane to prevent a rippling of the fabric in order to prepare a leno selvage at each side. The arrangement of one or more propeller lenos in the cutting lane has the disadvantage, however, that, because said propeller leno has a relatively wide construction, the cutting lane is correspondingly wide, which means that "fabric is lost".

SUMMARY OF THE INVENTION

The underlying object of the invention accordingly comprises providing a remedy here. An apparatus of the initially named kind should in particular be provided which has a relatively narrow construction, which has a high torque and which is accordingly able to provide high acceleration values so that, in a similar manner to the previously described propeller leno, it is able to provide the position shed open or shed closed independently of the movement of the heddle shafts.

The object is achieved in accordance with the invention by an apparatus for forming a leno selvage, in particular for a loom, in accordance with claim 1. In this respect, the apparatus comprises a fixed-position housing having a support of the shape of a circle ring or of a circular disk and rotatably supported in the housing by a bearing, wherein the support has at least two ring gears of magnetizable material extending in parallel with one another over the outer periphery. This means that each ring gear composed of magnetizable material on the outer periphery has a continuous toothed arrangement. The support has two guide eyelets for the guidance of the two leno threads in the region of the inner race of the bearing, said guide eyelets being disposed diagonally opposite one another. A plurality of magnet are arranged on the outer periphery or outer jacket of the support in the region of the ring gears, wherein the housing associated with the two ring gears has a stator sheet package of the shape of a circle ring and having a plurality of coils arranged therein, wherein the stator sheet package has segments having a respective toothed arrangement associated with the toothed arrangement of the ring gears in the region of the coils. The spatial extent of the segments in this respect approximately corresponds to the size of the coils. The rotor of the electromagnetic drive is in this respect formed by the support with the ring gears and by magnets connected to the ring gears.

An electromagnetic drive which has a comparatively high torque is in particular provided due to the ring gears having the toothed arrangement arranged over the periphery of the ring gears in conjunction with the segments of the stator sheet package likewise provided with a toothed arrangement. Due to the high torque, acceleration values can be reached which are sufficient with certain looms to allow such a leno selvage apparatus such as is the subject matter of the invention to precede the respective shed opening or shed dosing. This means that a trapezoidal speed development can be provided by the apparatus in which the flanks extend comparatively steeply, in a very similar manner as is the case with the previously treated propeller leno. To this extent, a bearing regulation is also not necessary such as the case in accordance with the prior art, for example in accordance with DE 197 33 261 C2. It is rather completely sufficient if the motor receives corresponding control signals for the shed opening or shed closing. This means that the electromagnetic drive in accordance with the invention does not rotate continuously synchronously with the heddle shafts; it rather "flips", which means that when it receives a signal for the shed opening, it moves into the corresponding position and then waits until it receives a corresponding signal for the shed closing.

Advantageous features and embodiments of the invention result from the dependent claims.

Provision is thus in particular made that the housing is configured as two shells and has a holder for arrangement at a loom so that the apparatus is simple to install and can be attached by the holder in the cutting lane of the loom to produce a leno selvage. Two apparatus of the initially named kind, which stand at a small distance from one another, are advantageously arranged in the cutting lane to produce a leno selvage at each side of the fabric. The distance of the two apparatus from one another is required to provide space for the leading through of the leno threads.

To ensure the rotational capability of the support as a component of the rotor, the support is connected to the inner race of the bearing, with the outer race of the bearing being supported in the housing.

Provision is made in accordance with a further advantageous feature of the invention that the teeth of the toothed arrangement of the one ring gear stand offset by half a tooth pitch with respect to the toothed arrangement of the other ring gear. It is hereby achieved that always only one tooth of one of the two toothed arrangements of the ring gears cooperates with the teeth of the toothed arrangement of the segments. A high torque is in particular also reached in conjunction with an arrangement of the teeth of the ring gears which is a particularly small part and is also reached on the toothed arrangement of the segment. Provision is thus in particular made that the spacing of two teeth of both the toothed arrangement of the ring gears and of the toothed arrangement of the segments amounts to approximately 1.5 to 2.0 mm. It generally applies that the pitch of the toothed arrangement on the ring gears and on the segments is substantially the same. This means that the tooth pitch of the toothed arrangement of the ring gears and that of the segments do not necessarily have to be exactly the same; it is rather even of advantage to provide a very small deviation of only some few teeth (1 or 2) fewer or more. The cogging torque and thus the waviness of the torque is thus reduced, which accommodates a microstep operation. The performance of the drive can be further increased by a microstep operation.

Two variants are conceivable with regard to the arrangement of the magnets. It is conceivable in accordance with a first embodiment that the plurality of the magnets form at least one magnet ring. A continuous magnet ring of magnets has the advantage over a plurality of individual magnets which are arranged individually spaced apart from one another on the support that the electromagnetic drive has a higher torque and consequently also has a higher acceleration than is the case on the use of individual spaced apart magnets. Provision is made in detail in this connection that the magnets are arranged between the two ring gears standing in connection with the ring gears. The same applies accordingly when the individual magnets are formed as a magnet ring. The alignment is in this respect axial from the north pole to the south pole. This has the advantage that the two ring gears are held by the magnets and can thus be installed as a unit.

A second embodiment is characterized in that a separate magnet ring is associated with each ring gear, wherein the ring gear is supported on the corresponding magnet ring. The advantage of this second embodiment with respect to the first embodiment, in which the magnets or the magnet ring is arranged between the two crowns, is that here the magnetic flux is aligned directly radially. It is the case in the first embodiment that the magnetic flux is deflected from the axial direction in the radial direction, which is ultimately associated with small torque losses. This means that the second embodiment, in which a magnet ring is associated with each ring gear, has a higher torque. In this second embodiment, provision is correspondingly made that the alignment is radial from the north pole to the south pole.

The invention also relates to a projectile loom having at least one cutting lane for dividing the fabric web which is also characterized in accordance with the invention in that at least one apparatus, preferably two apparatus, is/are arranged in the cutting lane. The warp beam can in this respect be configured as continuous.

The invention will be described in more detail below by way of example with reference to the drawings.

DETAILED DESCRIPTION OF THE INVENTION

Figure 1:
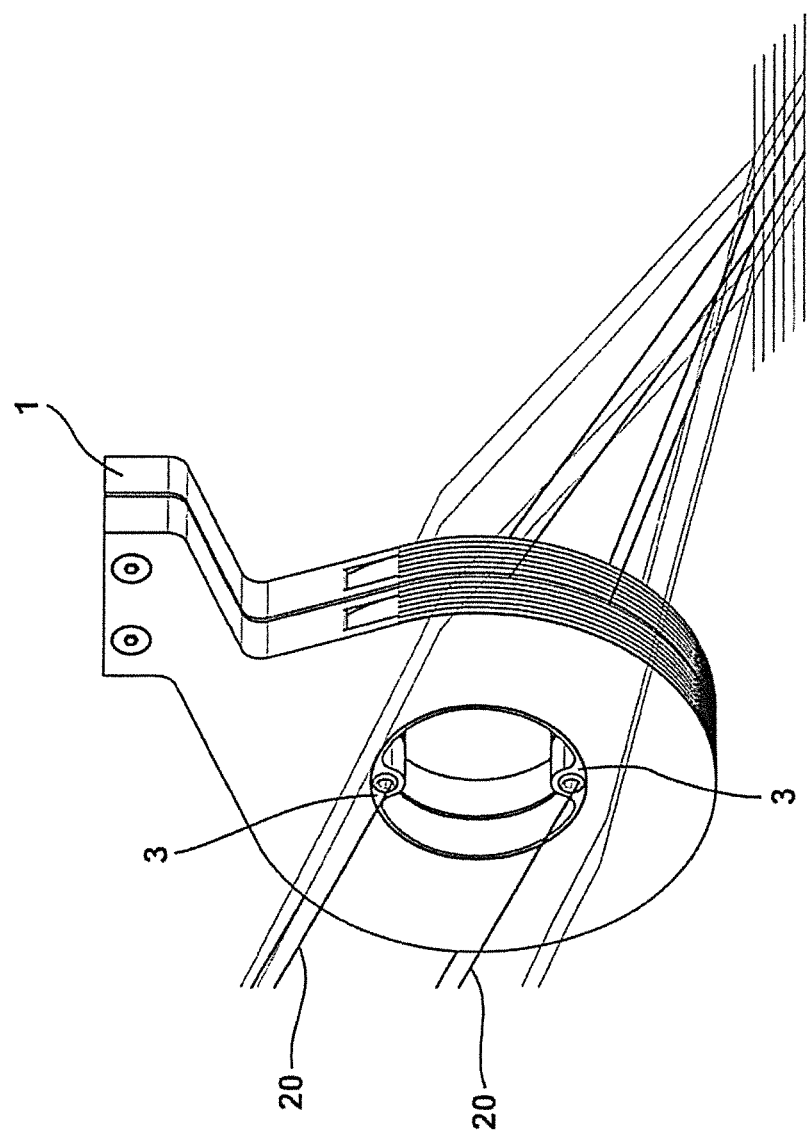
FIG. 1 is a perspective view showing two electromagnetically working apparatus for forming a leno selvage with an indicated fabric in accordance with an embodiment of the invention.

In accordance with FIG. 1, two apparatus 1 are shown for forming a respective leno selvage each, wherein a slight distance is provided between the two apparatus to guide the leno threads 20, which are guided by the thread eyelets 3, in the direction of the warp beam.

Figure 2:
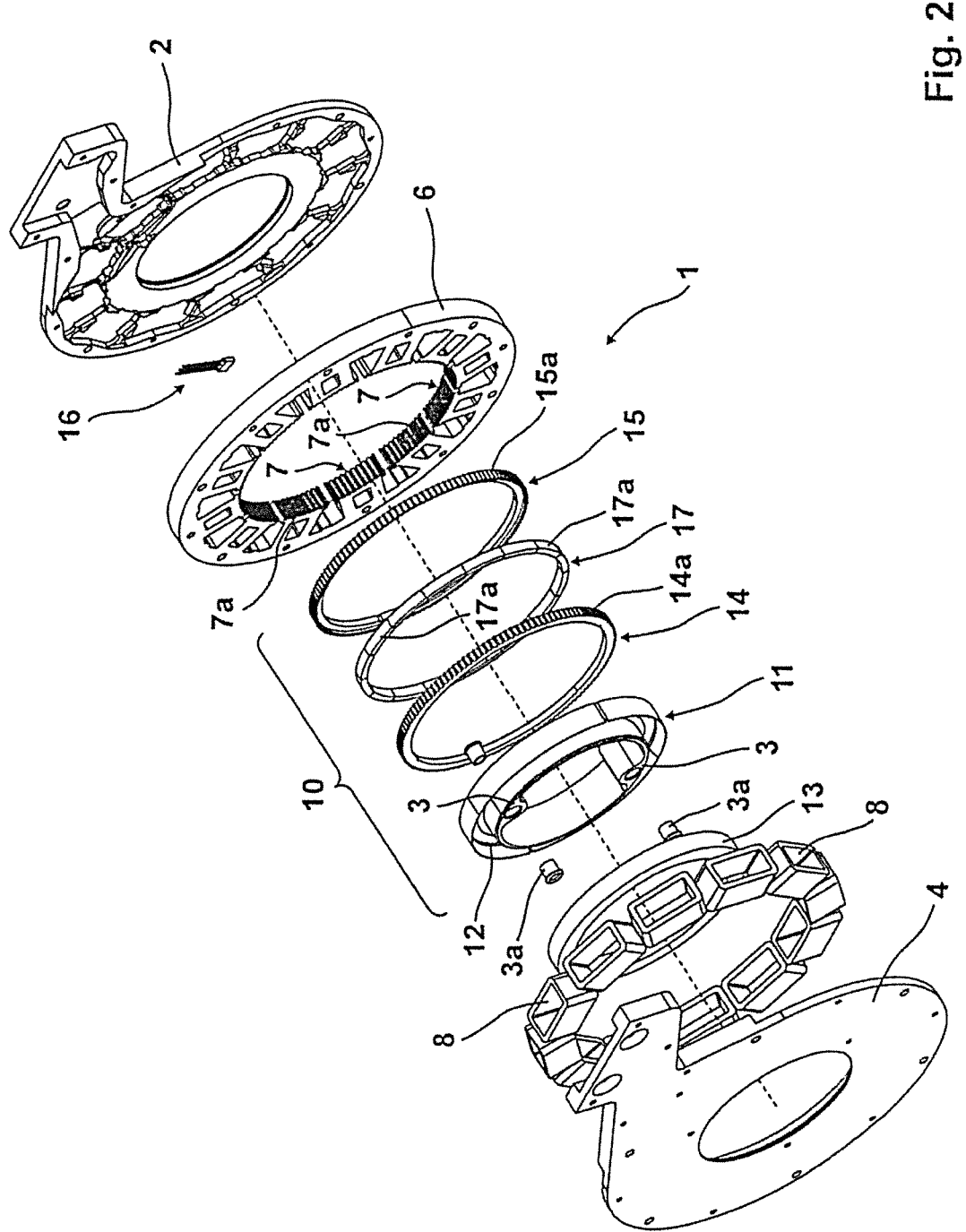
FIG. 2 is an exploded view showing the apparatus for forming a leno selvage in accordance with an embodiment of the invention.
Figure 3:
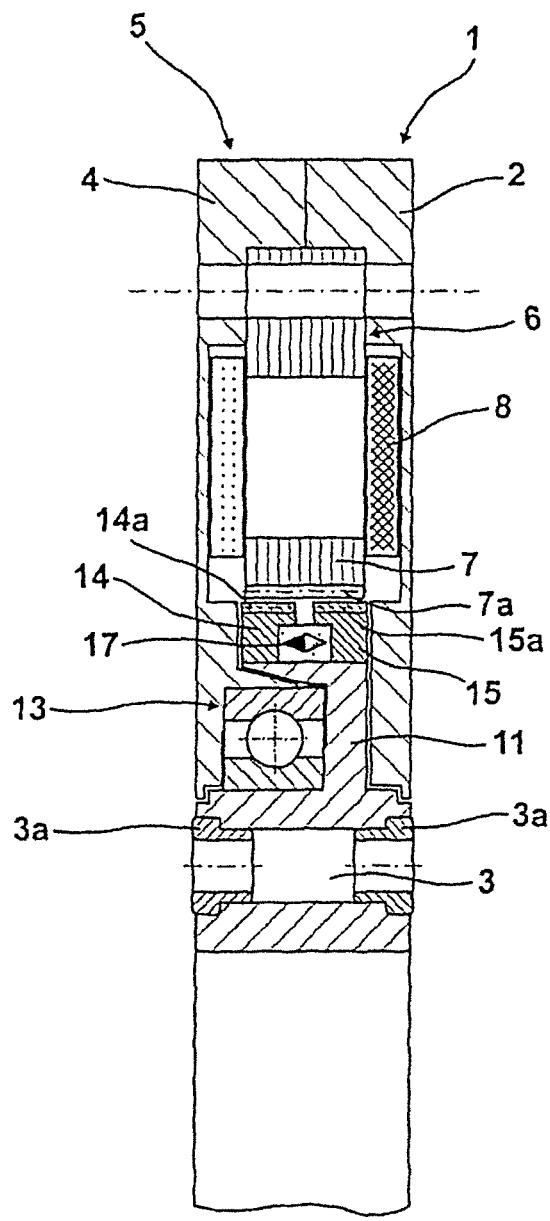
FIG. 3 is a cross-sectional view of the apparatus for forming a leno selvage in accordance with FIG. 2.

The subject of the invention in the first embodiment is now the configuration of the electromagnetically working apparatus for forming a leno selvage in accordance with FIGS. 2 and 3. The apparatus 1 for forming a leno selvage shown in FIG. 2 in the form of an exploded drawing comprises the two housing shells 2, 4, wherein a stator sheet package 6 which carries the plurality of coils 8 can be received by the two housing shells 2, 4, as is known with electric motors. The rotor, marked as a whole by 10, comprises the support 11 which has the two thread eyelets 3 which are disposed opposite one another at the inner side and which is provided with inserts 3a for reducing the wear by the leno threads guided through the thread eyelets 3. The carrier 11 as part of the rotor 10 furthermore has a groove 12 which serves the reception of the roller element bearing marked by 13. The support 11 is rotatably supported in the housing 5 formed by the housing shells 2, 4 using the roller element bearing 13. The two ring gears 14, 15 are supported over the periphery of the support 11, wherein the ring gears have the radially outwardly directed toothed arrangement 14a, 15a such as results directly when viewing FIG. 2. The magnet ring comprising individual magnets 17a and marked by 17 is located between the two rig gears 14, 15. The rotor 10 thus comprises the support 11, the magnet ring 17, the ring gears 14, 15 and, optionally, the roller element bearing 13. A Hall sensor 16 is furthermore provided. The Hall sensor 16, however, not only serves the continuous detection of the angle of rotation for a bearing regulation, but also only for the detection of a single, fixed, so-called reference position. The latter is only traveled to exactly once directly after the power supply is switched on to obtain a defined angle of rotation. This Hall sensor is no longer required in the further operation up to the next switching on. The angle of rotation in operation is then calculated by a control by addition or subtraction of the individual steps in dependence on the direction of rotation.

A section through the apparatus shown in FIG. 2 results in the view of FIG. 3.

The stator sheet package 6 has a segment 7 having a toothed arrangement 7a over the inner periphery in region of each coil 8, wherein the toothed arrangement 7a on the segment 7 is identical to the toothed arrangement 14a, 15a over the respective ring gear 14, 15 with respect to the tooth pitch. The lateral extent of the segments 7 is in this respect such that the toothed arrangement 14a, 15a of both ring gears 14, 15 is covered.

Figure 4:
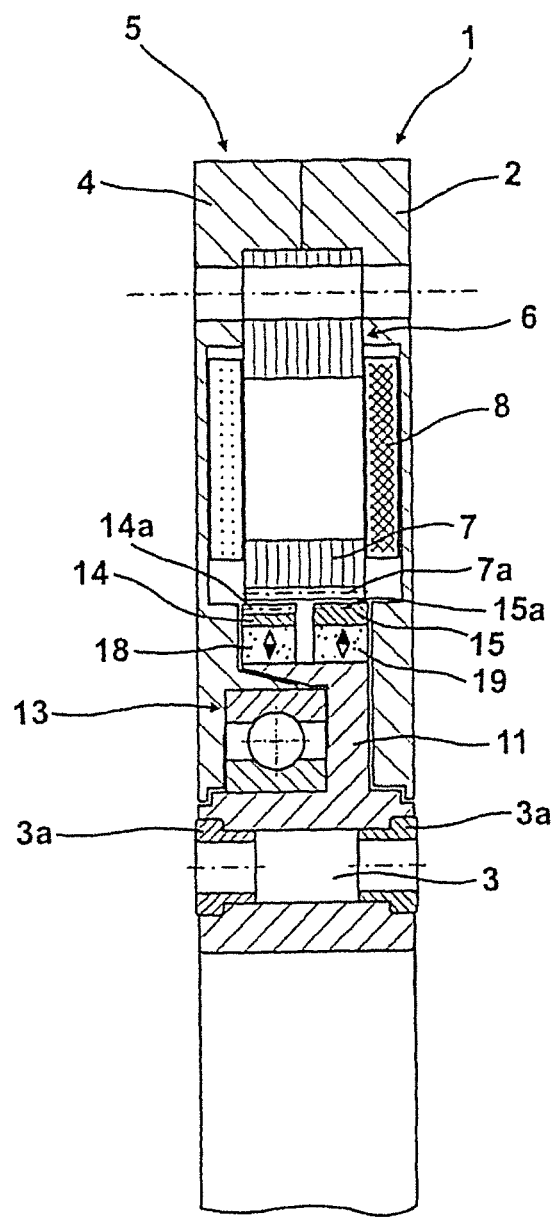
FIG. 4 is a cross-sectional view of an apparatus for forming a leno selvage in accordance with another embodiment of the invention.

FIG. 4 shows a further variant with respect to the embodiment of the electromagnetic drive in accordance with FIGS. 2 and 3. This is to the extent that the support 11, which is formed from magnetizable material, for example soft iron, has two magnet rings 18, 19 over its periphery, wherein the corresponding ring gear 14, 15 is arranged on the magnet rings 18, 19. In the embodiment in accordance with FIG. 3, the magnet ring 17 shown there is axially aligned with respect to the polarity, whereas the alignment is radial in the magnet rings 18, 19. A pole reversal therefore no longer has to take place here, which, as already stated, produces an increased torque of such a motor with respect to a motor in accordance with the representation in accordance with FIG. 3.

REFERENCE NUMERAL LIST 1 apparatus for forming a leno selvage
2 housing shell
3 thread eyelet
3a insert
4 housing shell
5 housing (comprising the two housing shells)
6 stator sheet package
7 segment
7a toothed arrangement on segment
8 coil
10 rotor
11 support
12 groove
13 roller element bearing
14 ring gear
14a toothed arrangement
15 ring gear
15a toothed arrangement
16 Hall sensor
17 magnet ring
17a magnets
18 magnet ring
19 magnet ring
20 leno threads

The invention claimed is:

1. An apparatus for forming a leno selvage for a loom, comprising:
   a fixed-position housing;
   a bearing having an inner race and an outer race;
   a support having a shape of a circular ring or of a circular disk and rotatably supported in the housing by the bearing, the support having an outer periphery and two diagonally oppositely disposed thread eyelets for guiding leno threads adjacent the inner race of the bearing;
   at least two ring gears of magnetizable material extending in parallel with one another on the outer periphery of the support, wherein the at least two ring gears each have a radially outwardly directed toothed arrangement;
   a plurality of magnets arranged on the outer periphery of the support adjacent the at least two ring gears;
   a stator sheet package received by the housing and having a shape of a circular ring and segments, each segment carrying a coil and having a toothed arrangement on an inner periphery of the segment, the toothed arrangement of each segment corresponding to the toothed arrangement of the at least two ring gears adjacent the coils.

2. An apparatus for forming a leno selvage for a loom in accordance with claim 1, wherein the housing comprises two shells and is arranged at a loom on a holder.

3. An apparatus for forming a leno selvage for a loom in accordance with claim 1, wherein the support is connected to the inner race of the bearing, with the outer race of the bearing being supported by the housing.

4. An apparatus for forming a leno selvage for a loom in accordance with claimed embodiments, wherein the teeth of the toothed arrangement of one of the at least two ring gears are arranged offset by half a tooth pitch with respect to the teeth of the toothed arrangement of the other of the at least two ring gears on the support.

5. An apparatus for forming a leno selvage for a loom in accordance with claim 1, wherein the plurality of magnets form at least one magnet ring.

6. An apparatus for forming a leno selvage for a loom in accordance with claim 5, wherein the magnets are arranged between the at least two ring gears.

7. An apparatus for forming a leno selvage for a loom in accordance with claim 5, wherein the alignment of the magnets from the north pole to the south pole is parallel to an axial direction of the at least one magnetic ring.

8. An apparatus for forming a leno selvage for a loom in accordance with claim 1, wherein a magnet ring is associated with each of the at least two ring gears, with each of the at least two ring gears being supported on the corresponding magnet ring.

9. An apparatus for forming a leno selvage for a loom in accordance with claim 8, wherein the alignment of the magnetic rings from the north pole to the south pole is in a radial direction of the magnetic rings.

10. An apparatus for forming a leno selvage for a loom in accordance with claim 1, wherein the pitch of the toothed arrangement of the at least two ring gears and the pitch of the toothed arrangement of the segments of the stator sheet package is substantially the same.

11. An apparatus for forming a leno selvage for a loom in accordance with claim 1, wherein the bearing is a roller element bearing.

12. A projectile loom having at least one cutting lane for dividing a fabric web, wherein at least one apparatus in accordance with claim 1 is arranged in the cutting lane.

13. A projectile loom in accordance with claim 12, wherein a warp beam of the projectile loom is continuous.

* * * * *